Dec. 16, 1930. E. FONFEREK 1,785,117
ANTISKID CHAIN
Filed July 28, 1928
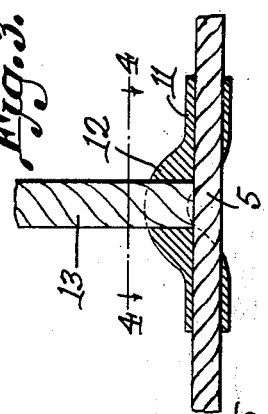
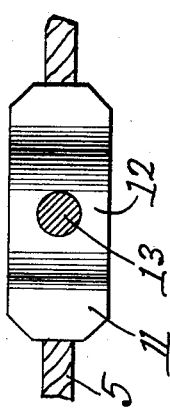
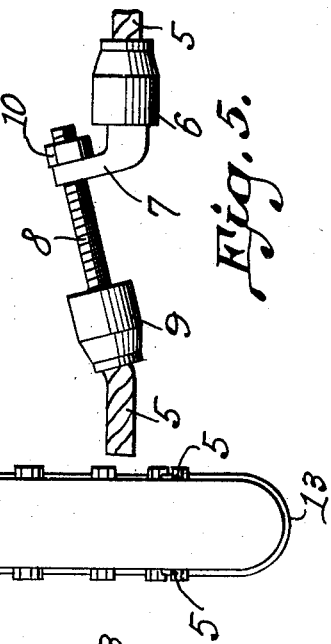
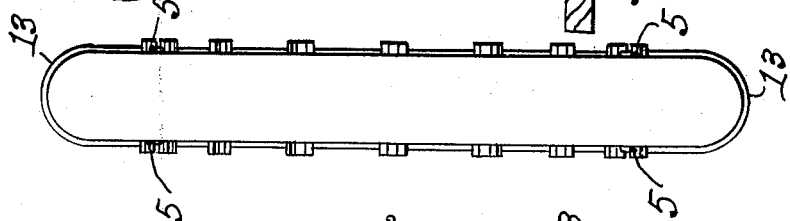
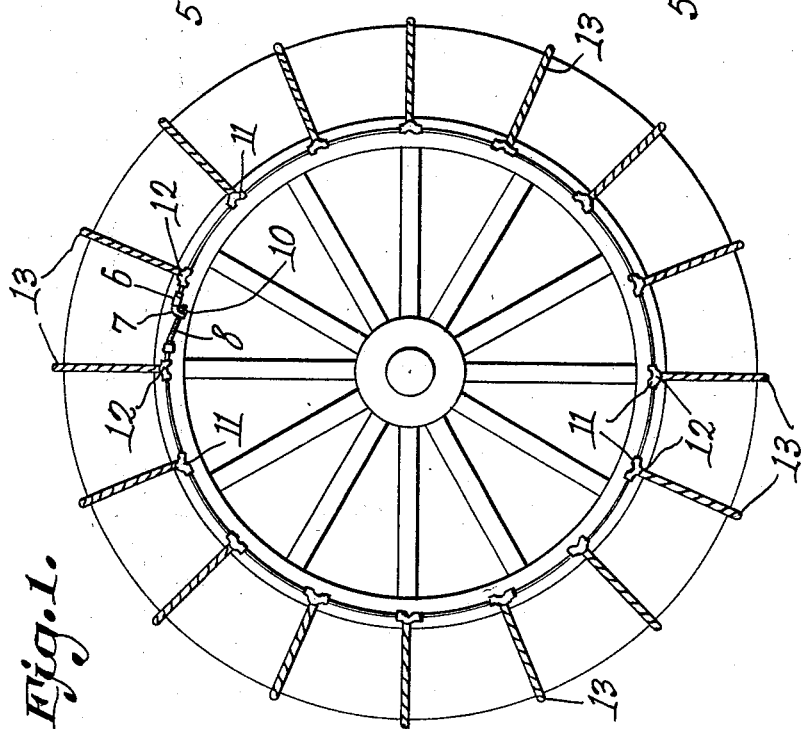
E. Fonferek, Inventor Patented Dec. 16, 1930

1,785,117

UNITED STATES PATENT OFFICE

EDWARD FONFEREK, OF GILLETT, WISCONSIN

ANTISKID CHAIN

Application filed July 28, 1928. Serial No. 296,021.

This invention has reference to anti-skid devices, and more particularly to an anti-skid device especially designed for use in connection with truck tires, the primary object of the invention being to provide an anti-skid device which will operate efficiently, and one which will be exceptionally strong and durable.

Another object of the invention is the provision of means for securing the tread members to the supporting members in such a way as to provide a permanent connection between the tread members and supporting members to insure against the tread members being pulled away from the supporting members under severe strains.

A still further object of the invention is to provide means for securing the device to a wheel which may be readily and easily operated permitting the device to be positioned on a wheel with facility.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a wheel equipped with an anti-skid device constructed in accordance with the invention.

Figure 2 is a vertical sectional view through the device.

Figure 3 is a sectional view through one of the connecting members, employed for connecting the tread members to the supporting members.

Figure 4 is a sectional view taken on line 4—4 of Figure 3.

Figure 5 is a perspective view of the securing device.

Referring to the drawing in detail, the device embodies a pair of supporting cables 5, the outer cable being split so that the device may be positioned over a wheel.

Secured to one end of the split cable is a head 6 that has an offset apertured member 7 through which the threaded bolt 8 extends, the bolt 8 being secured to the head 9 that is also secured to the split cable as clearly shown by Figure 5 of the drawing.

A nut indicated at 10 is mounted on the bolt 8 and is adapted to bear against the offset member 7 to draw the ends of the split cable together after it has been positioned, thereby providing means for securing the anti-skid device to a wheel.

The reference character 11 designates fastening devices which are formed with openings to receive the cable 5 associated therewith, the fastening devices having offset portions 12 which are formed with openings to receive the ends of the tread or cross members 13 of the anti-skid device.

After the members 11 have been positioned, they are secured to the cables by the welding method, thereby insuring against the members becoming disconnected under severe strains. In order that the members 11 will closely engage the rim of the wheel supporting the tire with which the device is used, the side edges of the members 11 are flat so that the connection between the anti-skid device and wheel will be free of movement.

From the foregoing it will be obvious that I have provided an anti-skid device embodying cables which are exceptionally strong and durable, eliminating the use of chains which are not only subject to great wear, but which readily break at their connections.

I claim:

A connector for the ends of cables of antiskid devices comprising a head secured to one end of a cable, an apertured member extending from said head, said apertured member being extended laterally, a bolt extending from the opposite end of the cable and passing through the apertured member, and a nut operating on the bolt for drawing the ends of the cable together.

In testimony that I claim the foregoing as my own, I have hereto affixed my signature.

EDWARD FONFEREK.